United States Patent [19]
Gorczyca

[11] 4,371,344
[45] Feb. 1, 1983

[54] TENSION MODEL DEVICE

[76] Inventor: Edward Gorczyca, 2905 Hemlock Dr., Allison Park, Pa. 15101

[21] Appl. No.: 260,043

[22] Filed: May 4, 1981

[51] Int. Cl.³ .......................................... G09B 23/08
[52] U.S. Cl. .................................. 434/302; 434/216; 434/403; 46/29
[58] Field of Search ............... 434/211, 216, 302, 403, 434/277, 278, 279, 280, 281, 298; 46/26, 29

[56] References Cited

U.S. PATENT DOCUMENTS

| | | | |
|---|---|---|---|
| 630,217 | 8/1899 | Hanstein | 434/216 |
| 1,281,856 | 10/1918 | Shaw | 46/29 |
| 3,169,611 | 2/1965 | Snelson | |
| 3,360,883 | 1/1968 | Glanzer | 46/29 |

Primary Examiner—William H. Grieb
Attorney, Agent, or Firm—Buell, Blenko, Ziesenheim & Beck

[57] ABSTRACT

A tension model device is disclosed which has: Three struts which cross each other at or near the center portion of each strut; and a plurality of corresponding tension strands. The strands are joined from each end of all the struts to each end of the other struts. To facilitate assembly, a removable block is inserted where the struts cross each other. The block has three notches on its surface that engage the struts and space them from each other.

3 Claims, 3 Drawing Figures

TENSION MODEL DEVICE

The invention relates to a tension model device which is used to teach principles of static forces. To assist one in the assembly of the model a block is used to align struts. Once the struts are aligned and the strands and struts are in tension the block can be removed.

Other details, object and advantages of this invention will become apparent as the following description of the present preferred embodiment proceeds.

DESCRIPTION OF THE INVENTION

Figure 1:
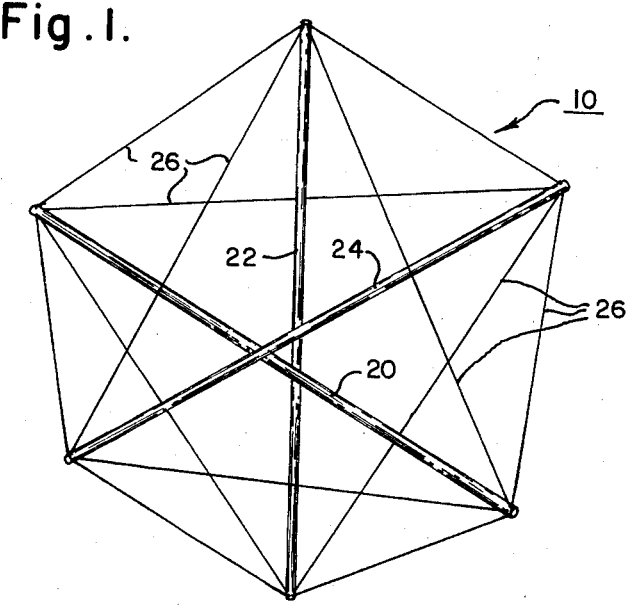
FIG. 1 is an isometric view of the tension device without the block.
Figure 3:
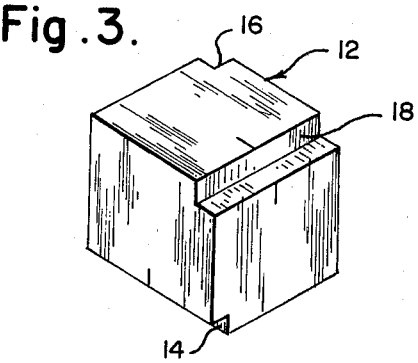
FIG. 3 is an isometric view of the block.
Figure 2:
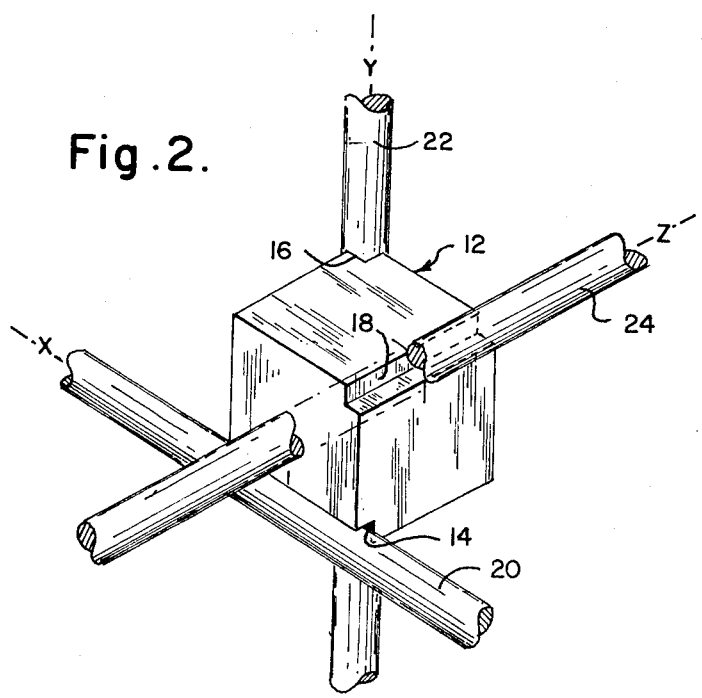
FIG. 2 is an isometric fragmentary view of the tension device showing the strusts engaging the block.

The tension device 10 is constructed using a block 12 which has non-intersecting notches 14, 16, and 18 forming X, Y and Z coordinates respectively. Struts 20, 22 and 24 engage the notches 14, 16 and 18 at the center section of each strut. Twelve strands 26 are joined from each end of all the struts 20, 22 and 24 to each end of the other struts thereby producing a tension model device 10. The block 12 can be removed and the device will appear as that shown in FIG. 1.

The block 12 can be a cube. The notches 14, 16 and 18 can be cut at 0.125 units in both dimensions of the cut; the block can be 1 unit cubed; each strut can be 0.125 units in diameter and 16 units long; three of the twelve strands can be 10.653638 units long, six of the twelve strands can be 11.379807 units long and three of the twelve strands can be 12.062338 units long. Every strand can be pretensioned to a load below the ultimate strength of the material used.

I claim:

1. A tension model device comprising:
    (a) three struts each having a pair of opposite ends and crossing each other near a center portion of each strut;
    (b) a plurality of tension strands in which strands are joined from each end of all the struts to each end of the other struts; and
    (c) a removable block means inserted where the struts cross each other, the block means having three non-intersecting notches on its surface engaging each strut and spacing the struts from each other where the struts cross each other, the notches are each formed by two substantially planar surfaces intersecting each other.

2. A tension model device as recited in claim 1 wherein the block means is a cube having notches on three nonintersecting edges known as X, Y and Z coordinates and spaced apart from each other.

3. A tension model device as recited in claim 1 or 2 wherein the number of tension strands is twelve.

* * * * *

UNITED STATES PATENT AND TRADEMARK OFFICE
CERTIFICATE OF CORRECTION

PATENT NO. : 4,371,344
DATED : February 1, 1983
INVENTOR(S) : EDWARD GORCZYCA

It is certified that error appears in the above-identified patent and that said Letters Patent are hereby corrected as shown below:

Column 1, line 18, "strusts" should be --struts--.

Signed and Sealed this

Twelfth Day of April 1983

[SEAL]

Attest:

GERALD J. MOSSINGHOFF

Attesting Officer       Commissioner of Patents and Trademarks